United States Patent [19]

Van Steenwyk

[11] Patent Number: 4,833,787
[45] Date of Patent: May 30, 1989

[54] HIGH SPEED WELL SURVEYING AND LAND NAVIGATION

[75] Inventor: Donald H. Van Steenwyk, San Marino, Calif.

[73] Assignee: Applied Technologies Associates, San Marino, Calif.

[21] Appl. No.: 60,648

[22] Filed: Jun. 11, 1987

Related U.S. Application Data

[63] Continuation-in-part of Ser. No. 768,746, Aug. 23, 1985, Pat. No. 4,706,388.

[51] Int. Cl.$^4$ ............................................. G01C 19/38
[52] U.S. Cl. ....................................... 33/302; 33/304; 33/324
[58] Field of Search ...................... 33/141.5, 333, 304, 33/318, 313, 312, 324, 302

[56] References Cited

U.S. PATENT DOCUMENTS 3,058,242 10/1962 Ocnaschek ................... 33/141.5 X
3,151,235 9/1964 Geenshields .................. 33/141.5 X
4,559,713 12/1985 Ott et al. ......................... 33/304 X Primary Examiner—William D. Martin, Jr.
Attorney, Agent, or Firm—William W. Haefliger

[57] ABSTRACT

A land vehicle navigation apparatus incorporates an inertial angular rate sensor on the vehicle and having a sensitive axis, and an inertial acceleration or tilt sensor having at least two sensitive axes; the latter two sensitive axes are typically located at the vehicle in a plane parallel to the Earth's surface; and a rotary drive is operatively connected to the sensors to rotate them about an axis extending generally at the vehicle in a plane parallel to the Earth's surface; and, circuitry is operatively connected with the sensors to determine three vehicle orientation angles, roll, pitch, and azimuth, with respect to an Earth-fixed coordinate set at a first location, and also to determine the three vehicle orientation angles as the land vehicle travels over the Earth surface; and changes to the azimuth angle during travel are determined by integration of the output of the rate sensor; also, the sensor, drive and circuitry are typically carried by the vehicle.

15 Claims, 11 Drawing Sheets

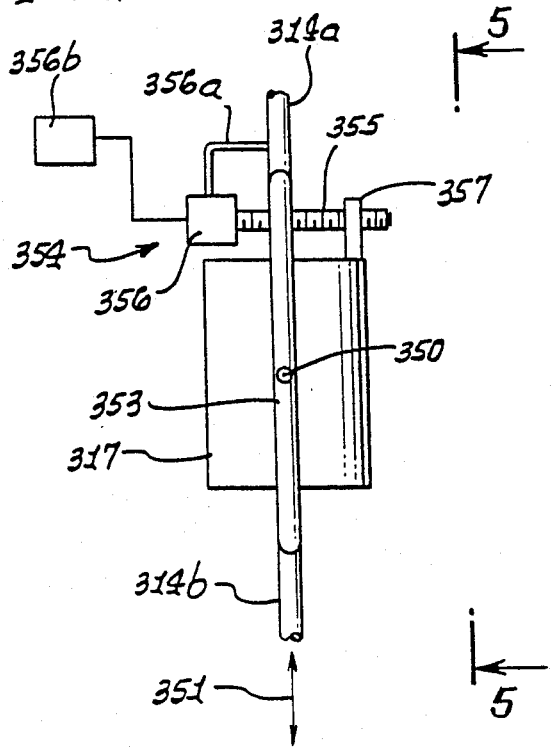
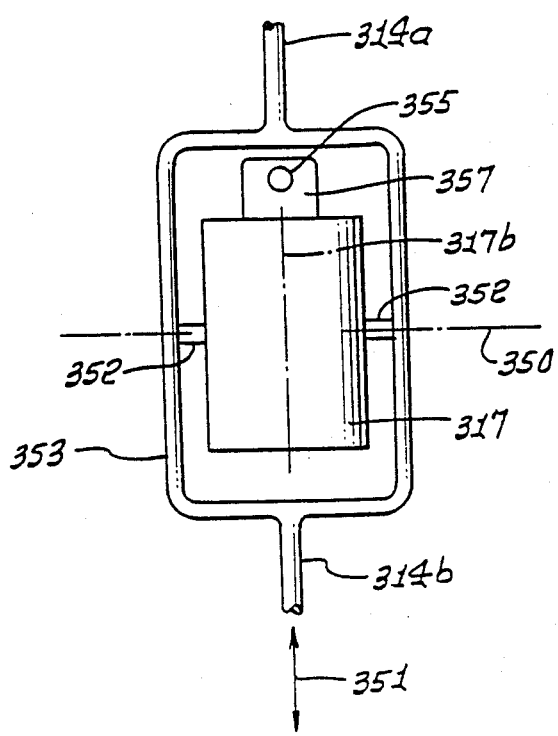
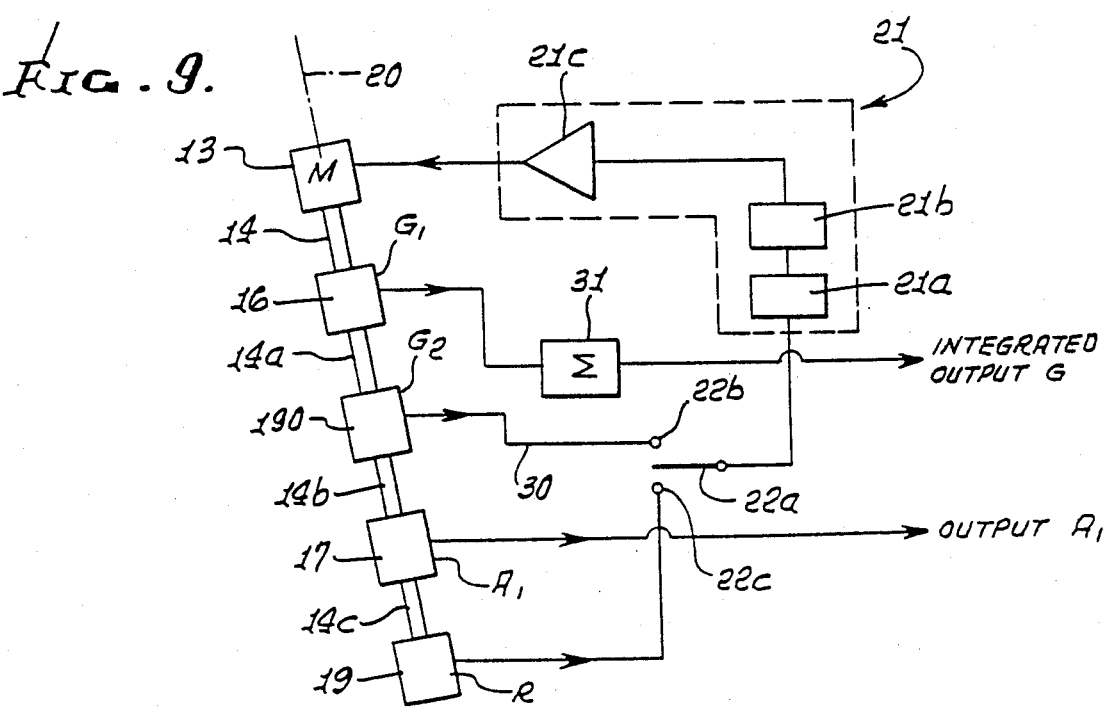

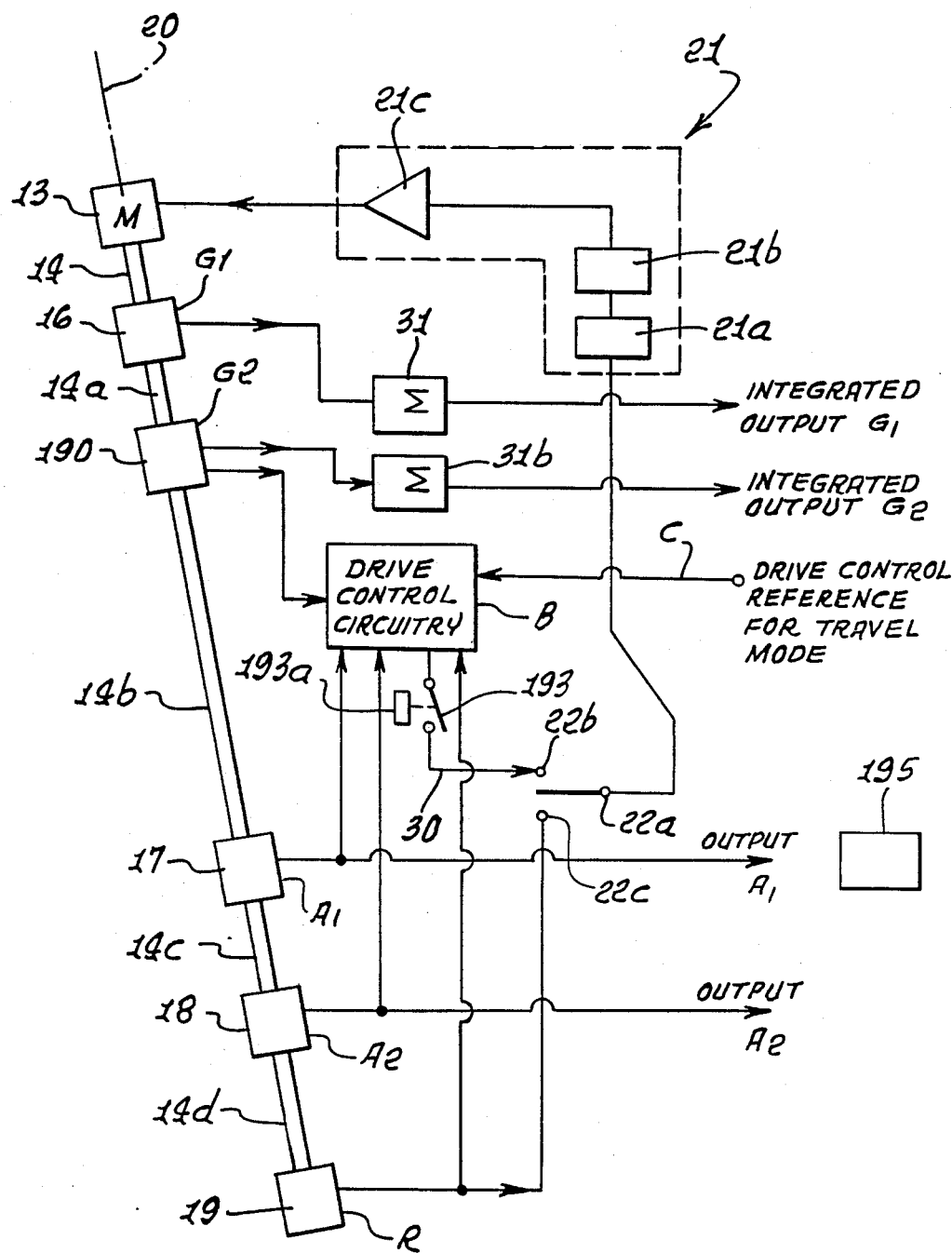

HIGH SPEED WELL SURVEYING AND LAND NAVIGATION

BACKGROUND OF THE INVENTION

This application is a continuation-in-part of U.S. application Ser. No. 768,746 filed Aug. 23, 1985 and entitled "High Speed Well Surveying" now U.S. Pat. No. 4,736,388. This invention relates generaly to surveying of boreholes, and more particularly concerns methods and apparatus which enable significant reductions in well survey time; also it relates to land navigation apparatus and methods.

In the past, the task of position mapping a well or borehole for azimuth in addition to tilt has been excessively complicated, very expensive, and often inaccurate because of the difficulty in accomodating the size and special requirements of the available instrumentation. For example, magnetic compass devices typically require that the drill tubing be fitted with a few tubular sections of non-magnetic material, either initially or when drill bits are changed. The magnetic compass device is inserted within this non-magnetic section and the entire drill stem run into the hole as measurements are made. These non-magnetic sections are much more expensive than standard steel drill stem, and their availability at the drill site must be pre-planned. The devices are very inaccurate where drilling goes through magnetic materials, and are unusable where casing has been installed.

Directional or free gyroscopes are deployed much as the magnetic compass devices and function by attempting to remember a-pre-set direction in space as they are run in the hole. Their ability to initially align is limited and difficult, and their capability to remember degrades with time and environmental exposure. Also, their accuracy is reduced as instrument size is reduced, as for example becomes necessary for small well bores. Further, the range of tilt and azimuthal variations over which they can be used is restricted by gimbal freedom which must be limited to prevent gimbal lock and consequent gyro tumbling.

A major advance toward overcoming these problems is described in my U.S. Pat. No. 3,753,296. That invention provides a method and means for overcoming the above complications, problems, and limitations by employing that kind and principal of a gyroscope known as a rate-of-turn gyroscope, or commonly 'a rate gyro', to remotely determine a plane containing the earth's spin axis (azimuth) while inserted in a bore-hole or well. The rate gyroscope has a rotor defining a spin axis; and means to support the gyroscope for travel in a bore-hole and to rotate about an axis extending in the direction of the hole, the gyroscope characterized as producing an output which varies as a function of azimuth orientation of the gyroscope relative to the earth's spin axis. Such means typically includes a carrier containing the gyroscope and motor, the carrier being sized for travel in the well, as for example within the drill tubing. Also, circuitry is operatively connected with the motor and carrier to produce an output signal indicating azimuthal orientation of the rotating gyroscope relative to the carrier, whereby that signal and the gyroscope output may be processed to determine azimuth orientation of the carrier and any other instrument thereon relative to the earth's spin axis, such instrument for example comprising a well logging device such as a radiometer, inclinometer, etc.

U.S. Pat. No. 4,192,977 improves upon U.S. Pat. No. 3,753,296 in that it provides for use of a "rate gyro" in combination with a free gyroscope, with the rate gyro used to periodically calibrate the free gyroscope. While this combination has certain benefits, it does not provide the unusually advantageous modes of operation and results as are afforded by the present invention. Among these are the enablement of very rapid surveying of boreholes; the lack of need for a free gyroscope to be periodically calibrated; and reduction in time required for surveying slanted boreholes, of particular advantage at depths where high temperatures are encountered.

The improvements in high speed well surveying discussed herein also find application in methods and apparatus for land-vehicle navigation. In present land vehicles, self-contained navigation capabilities have been provided by (1) use of various magnetic-compass direction references and a suitable sensor for measuring distance traveled over the earth, or (2) use of various free-gyroscope direction references and a suitable sensor for distance traveled over the earth, or (3) use of complete inertial navigation systems, with or without external position or velocity reference aids. These approaches have generally been of relatively poor accuracy for reasonable costs, or of excessive cost for highly accurate systems. In many land vehicles the large mass of iron-based materials completely prevents the use of magnetic-compass type direction sensors for all but the poorest performance requirements.

The land-vehicle navigation problem can be seen to have considerable similarity to the high speed well surveying problem. A sensor that provides a measure of vehicle distance traveled over the earth can be seen to provide the same type of information as that provided by the borehole-surveying apparatus wireline that measures the progression distance of the survey tool along the borehole axis. If the land vehicle carries an apparatus to measure inclination and azimuth directions for the vehicle, which apparatus is substantially equivalent to the basic apparatus describe herein for well surveying, then vehicle positioning with respect to the starting point as it travels over the earth surface can be computed. This computation is very similar to that for computing the position of the borehole survey apparatus as it progresses through the earth along the borehole.

In the borehole survey problem the survey tool is confined laterally in the borehole by the borehole dimensions and is generally traveled along the borehole direction at a constant velocity. These constraints reduce tool accelerations to negligible values so that no significant errors are introduced in computing azimuth, inclination or tilt, and position of the tool along the borehole. Also, the borehole survey problem normally applies to paths ranging from vertical to near horizontal.

The land vehicle navigation problem is concerned with substantial horizontal accelerations during vehicle travel over the earth, both in the long path and cross-path directions. Also, the vehicle path is nominally in a horizontal plane with equally-expected up and down movement over typical hilly terrain.

This continuation-in-part application addresses the application of unusually advantageous methods and apparatus developed for high speed well survey to the land vehicle navigation problem, and described modifications and extensions that permit highly accurate navigation in the presence of the dynamic acceleration environment of the land vehicle traveling over the surface of the earth.

SUMMARY OF THE INVENTION

It is one major object of the invention to provide method and apparatus facilitating rapid surveying of boreholes, as referred to. Typically, the survey method employs first means for measuring angular rate, and securing means for sensing tilt, said means having sensitive axes, a rotary drive for the first and second means, and circuitry to process outputs of the sensors and to control the drive the basic steps of the method including:

(a) operating the drive and the first and second means at a first location in the borehole, and also operating said circuitry to produce signals used to determine the azimuthal direction of tilt of the borehole at such location, (b) then traveling the first and second means and the drive lengthwise of the borehole away from the location, and operating the drive and at least one of the first and second means during such traveling and also operating said circuitry, to produce signals used to determine changes in borehole alignment during traveling, (c) and maintaining at least one of said sensitive axes at a predetermined orientation relative to horizontal during said travel.

As will be seen, the (c) step of the method typically involves maintaining an input axis defined by the second means at a predetermined orientation (such as horizontal) during traveling, the drive being controlled to accomplish this. For example, the first means may include first and second gyroscopes input axes, one being maintained horizontal during such travel. Accordingly, if the borehole changes its direction of tilt during instrumentation travel, the one gyroscope input axis senses changes in azimuth during the travel between upper and lower positions in the well. Further, the (a) step of the method may be carried out at each of the upper and lower positions prior to and subsequent to such travel, for accurately determining azimuthal direction of tilt of the hole at such locations. The (a) and (b) steps may be carried out in alternation, up or down the hole, to enable rapid surveying, as will be seen. One or more rate gyroscopes having one or more input axes can be used.

Apparatus embodying the invention comprises:

(a) angular rate sensor means having at least one sensitive axis, (b) tilt sensor means, (c) a rotary drive operatively connected to said (a) and (b) sensor means to rotate same about an axis extending generally in the direction of the borehole, (d) and circuitry operatively connected with said (a) and (b) sensor means to determine the aximuthal direction of tilt of the borehole at a first location therein, said (a) sensor means also connected in feedback relation with the drive whereby the sensitive axis of the (a) sensor means is maintained at a predetermined orientation relative to said first location, and whereby changes in borehole alignment during said travel may be determined.

The methods and apparatus of the land-vehicle navigation system disclosed herein correspond to those described above for finding inclination and azimuth of the survey tool in the borehole. The principal differences are that the methods and apparatus are used in a land vehicle rather than in a borehole and that for improved accuracy in some uses, a sensor for providing a measure of the vehicle velocity or distance of travel is added. With such a sensor, dynamic corrections to the vehicle vertical-direction indications can be computed. The sensor output may also be used to compute vehicle position relative to the initial starting point by combining the vehicle travel measurement properly with the azimuth and inclination (or tilt) outputs of the inertial angular rate and inclination sensing means.

Basically, the land navigation apparatus in accordance with the invention comprises, in combination with a land vehicle:

(a) inertial angular rate sensor means having at least one sensitive axis, (b) inertial acceleration tilt sensor means having at least two sensitive axes, and sensitive axes being arranged to be nominally located at the vehicle in a plane parallel to the Earth's surface, (c) a rotary drive operatively connected to said (a) means to rotate said (a) means about an axis extending generally at the vehicle in a plane parallel to the Earth's surface, (d) circuitry operatively connected with said (a) and (b) sensor means to determine three vehicle orientation angles, roll, pitch, and azimuth, with respect to an Earth-fixed coordinate set at a first location, and to also determine said three vehicle orientation angles as the land vehicle travels over the Earth surface wherein changes to said azimuth angle during travel are determined by integration of the output of said (a) sensor means, (e) said (a) and (b) means and said (c) drive being carried by the vehicle.

These and other objects and advantages of the invention, as well as the details of illustrative embodiment, will be more fully understood from the following description and drawings, in which:

DRAWING DESCRIPTION

FIG. 4 is a fragmentary elevation showing variable cant mechanism as usable in the FIG. 1 instrumentation;

FIG. 5 is a side view taken on lines 5—5 of FIG. 4;

FIG. 9 is a block diagram showing modified apparatus;

FIGS. 10 and 11 show modifications;

FIG. 15b shows a block diagram for controls related to FIG. 15a; and

DETAILED DESCRIPTION

Figure 1:
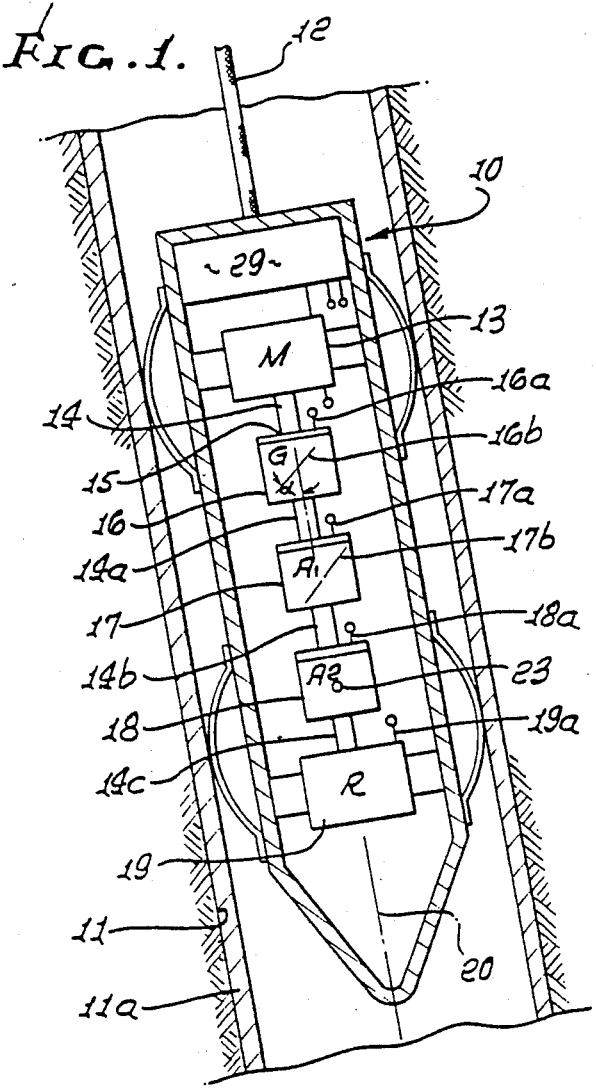
FIG. 1 is an elevation taken in section to show one form of instrumentation employing the invention.

Referring to FIG. 1, a carrier such as elongated housing 10 is movable in a borehole indicated at 11, the hole being cased at 11a. Means such as a cable to travel the carrier lengthwise in the hole is indicated at 12. A motor or other manipulatory drive means 13 is carried by and within the carrier, and its rotary output shaft 14 is shown as connected at 15 to angular rate sensor means 16. The shaft may be extended at 14a, 14b and 14c for connection. to first acceleration sensor means 17, second acceleration sensor means 18, and a resolver 19. The accelerometers 17 and 18 can together be considered as means for sensing tilt. These devices have terminals 16a—19a connected via suitable slip rings with circuitry indicated at 29 carried within the carrier (or at the well surface, if desired).

Figure 2:
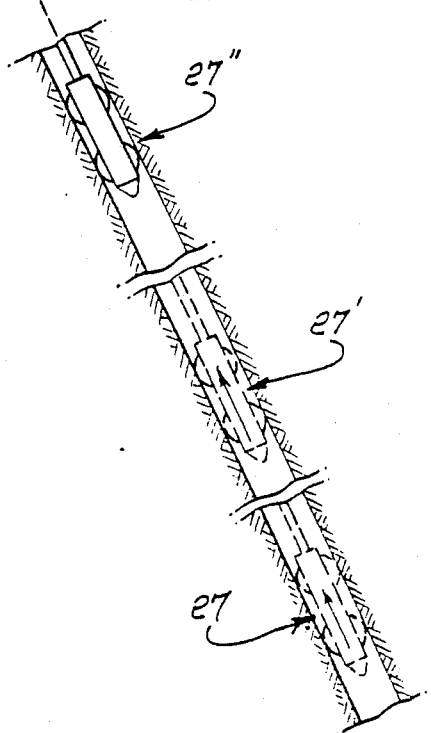
FIG. 2 is an elevation showing use of the FIG. 1 instrumentation in multiple modes, in a borehole.
Figure 1A:
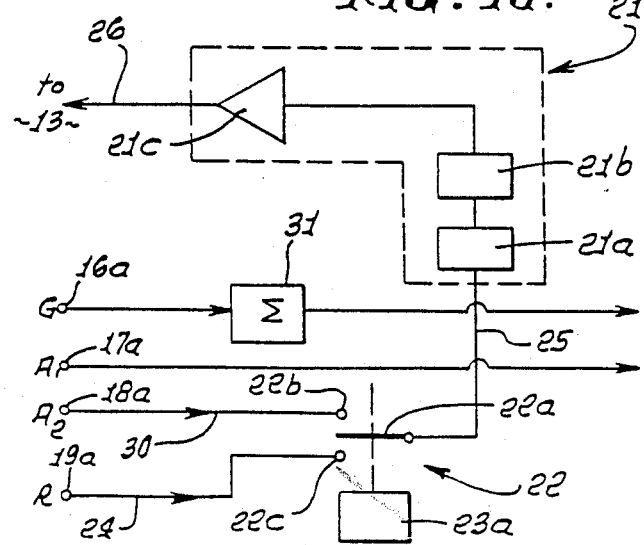
FIG. 1a is a circuit diagram.

Circuitry 29 typically may include a feed back arrangement as shown in FIG. 1a, and incorporating a feed back amplifier 21, a switch 22 having arm 22a and contacts 22b and 22c, and switch actuator 23a. When the actuator closes arm 22a with contact 22c, the resolver 19 is connected in feed back relation with the drive motor 13 via leads 24, 25, and 26, and amplifier 21, and the apparatus operates for example as described in U.S. Pat. No. 3,753,296 to determine the azimuthal direction of tilt of the bore hole at a first location in the bore hole. See for example first location indicated at 27 in FIG. 2. Other U.S. Pat. Nos. describing such operation are 4,199,869, 4,192,077, & 4,197,654. During such operation, the motor 13 rotates the sensor 16 and the accelerometers either continuously, or incrementally.

The angular rate sensor 16 may for example take the form of one or more of the following known devices, but is not limited to them:
1. Single degree of freedom rate gyroscope
2. Tuned rotor rate gyroscope
3. Two axis rate gyroscope
4. Nuclear spin rate gyroscope
5. Sonic rate gyroscope
6. Vibrating rate gyroscope
7. Jet stream rate gyroscope
8. Rotating angular accelerometer
9. Integrating angular accelerometer
10. Differential position gyroscopes and platforms
11. Laser gyroscope
12. Fibre optic rate gyroscope
13. Combination rate gyroscope and linear accelerometer Each such device may be characterized as having a "sensitive" axis, which is the axis about which rotation occurs to produce an output which is a measure of rate-of-turn, or angular rate $\omega$. That value may have components $\omega_1$, $\omega_2$ and $\omega_3$, in a three axis co-ordinate system. The sensitive axis may be generally normal to the axis 20 of instrument travel in the borehole, or it may be canted at some angle $\alpha$ relative to axis 20 (see canted sensitive axis 16b in FIG. 1).

Figure 3:
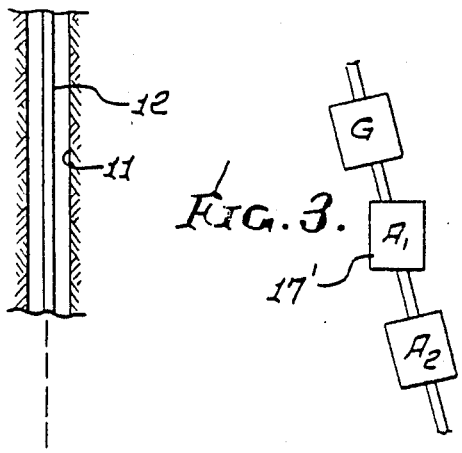
FIG. 3 is a schematic elevation showing a modification of FIG. 1 instrumentation.

The acceleration sensor means 17 may for example take the form of one or more of the following known devices; however, the term "acceleration sensor means" is not limited to such devices:
1. one or more single axis accelromters
2. one or more dual axis accelerometers
3. one or more triple axis accelerometers Examples of acceleration sensors include the accelerometers disclosed in U.S. Pat. Nos. 3,753,296 and 4,199,869, having the functions disclosed therein. Such sensors may be supported to be orthogonal or canted at some angle $\alpha$ relative to the carrier axis. They may be stationary or carouseled, or may be otherwise manipulated, to enhance accuracy and/or gain and added axis or axes of sensitivity. The sensor 17 typically has two output axes of sensitivity. A canted axis of sensitivity is seen at 17b in FIG. 1, and a canted accelerometer 17' (corresponding to accelerometer 17 in FIG. 1) is seen in FIG. 3. The axis of sensitivity is the axis along which acceleration measurement occurs.

The second accelerometer 18 may be like accelerometer 17, excepting that its input axis 23 is typically orthogonal to the input axis of the sensor 16 and of the accelerometer 17. During travel mode, i.e. lifting or lowering of the carrier 10 in the borehole 11, indicated at 27' in FIG. 2, the output of the second accelerometer 18 is connected via lead 30 (in FIG. 1a), contact 22b, switch arm 22a, and servo amplifier 21 to the drive motor 13. The servo system causes the motor to rotate the shaft 14 until the input axis 23 of accelerometer is horizontal (assuming that the borehole has tilt as in FIG. 2). Typically, there are two such axis 23 horizontal positions, but logic circuitry in the servo-system may for example cause rotation until the output of acceleration sensor 18 is positive. Amplifier 21 typically includes signal conditioning circuits 21a, feedback compensation circuits 21b, and power amplifier 21c driving the motor M shown at 13.

If, for example, the borehole is tilted 45° due East at the equator, accelerometer 17 would register +0.707 g or 45°, and the angular rate sensor 16 would register no input resulting from the earth's rate of rotation. If, then, the apparatus is raised (or lowered) in the borehole, while input axis 23 of accelerometer 18 is maintained horizontal, the output from accelerometer 17 would remain constant, assuming the tilt of the borehole remains the same. If, however, the hole tilt changes direction (or its elevation axis changes direction) the accelerometer 17 senses such change, the amount of such change being recorded at circuitry 29, or at the surface. If the hole changes its azimuth direction during such instrument travel, the sensor 16 senses the change, and the sensor output can be integrated as shown by integrator circuit 31 in FIG. 1a (which may be incorporated in circuitry 29, or at the surface) to register the angle of azimuth change. The instrumentation can be traveled at high speed along the tilted borehole while recording such changes in tilt and azimuth, to a second position (see position 27" in FIG. 2). At that position, the instrumentation is again operated as at 27 (mode #1) to accurately determine borehole tilt and azimuth—essentially a re-calibration step. Thus, the apparatus can be traveled hundreds or thousands of feet, operating in mode #2 as described, and between calibration positions which travel is arrested and the device is operated in mode #1.

The above modes of operation are typically useful in the tilted portion of a borehole; however, normally the main i.e. lower portion of the oil or gas well is tilted to some extend, and requires surveying. Further, this part of the hole is typically at relatively high temperature where it is desirable that the instrumentation be moved quickly to reduce exposure to heat, the invention lending itself to these objectives. In the vertical or near vertical (usually upper) portion of the hole, the instrumentation can revert to mode #1 operation, at selected positions, as for example at 100 or 200 foot intervals. In a rear vertical hole, azimuth contributes very little to hole position computation, so that mode #1 positions can be spaced relatively far apart, and thus this portion of the hole can be mapped rapidly, as well.

FIGS. 4 and 5 illustrate technique for adjusting the angularity of the axis of sensitivity of the first accelerometer relative to the lengthwise direction of instrument travel in the borehole. As shown, the accelerometer 317 (corresponding to accelerometer 17) has an axis of sensitivity (input axis) shown at 317b, which is rotatable about an axis 350 which is substantially normal to the direction of travel 351 in the borehole. Shaft extensions 314a and 314b correspond to extensions 14a and 14b in FIG. 1. The accelerometer 317 is carried by pivots 352 in a frame 353 to which shaft extensions 314a and 314b are connected, as shown. Control means 354 is also carried by the frame to adjust the cent of axis 317b, as for example at locations of mode #1 operation as described above, to improve the determination of azimuthal direction of tilt of the borehole, at such "calibration" locations, and/or at other instrument locations in the hole. The control means 354 may, for example, comprise a jack screw 355 driven by a reversible motor 356 suspended at 356a by the frame. The jack screw extends laterally and interfits a nut 357 attached to the accelerometer case, as for example at its top, offset from axis 350. A servo system 356b for the drive may be employed, so that a chosen angularity of axis 317b relative to direction 351 may be achieved. Support or suspension 356a may be resiliently yieldable to allow the accelerometer to be adjustably tilted, without jamming of the drive or screw.

Figure 6:
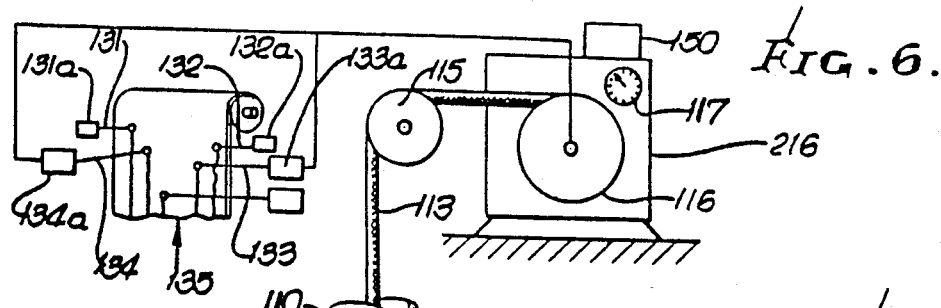
FIG. 6 is a vertical section showing further details of the FIG. 1 apparatus as used in a borehole.
Figure 7:
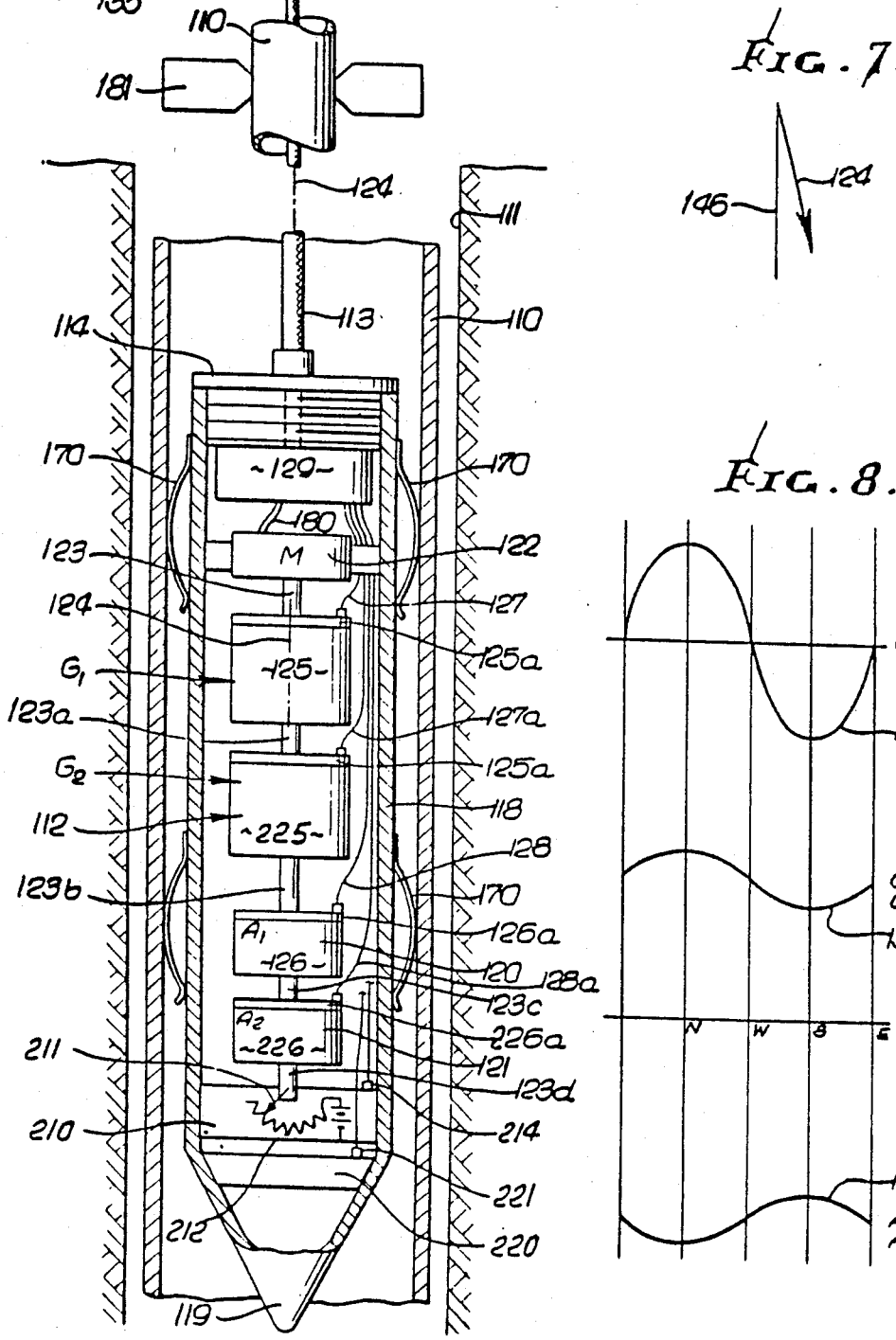
FIG. 7 is a diagram indicating tilt of the apparatus in a slanted borehole.
Figure 8:
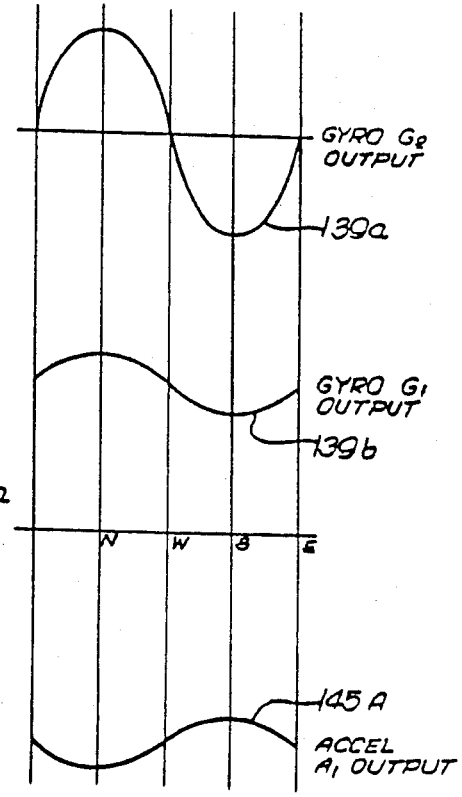
FIG. 8 is a wave form diagram.

FIGS. 6–8 show in more detail the apparatus of FIG. 1, and associated surface apparatus. In FIG. 6, well tubing 110 extends downwardly in a well 111, which may or may not be cased. Extending within the tubing is a well mapping instrument or apparatus 112 for determining the direction of tilt, from vertical, of the well or borehole. Such apparatus may readily be traveled up and down in the well, as by lifting and lowering of a cable 113 attached to the top 114 of the instrument. The upper end of the cable is turned at 115 and spooled at 116, where a suitable meter 117 may record the length of cable extending downwardly in the well, for logging purposes.

The apparatus 112 is shown to include a generally vertically elongated tubular housing or carrier 118 of diameter less than that of the tubing bore, so that well fluid in the tubing may readily pass, relatively, the instrument as it is lowered in the tubing. Also, the lower terminal of the housing may be tapered at 119, for assisting downward travel or penetration of the instrument through well liquid in the tubing. The carrier 118 supports first and second angular sensors such as rate gyroscopes $G_1$ and $G_2$, and accelerometers 120 and 121, and drive means 122 to rotate the latter, for travel lengthwise in the well. Bowed springs 170 on the carrier center it in the tubing 110.

The drive means 122 may include an electric motor and speed reducer functioning to rotate a shaft 123 relatively slowly about a common axis 124 which is generally parallel to the length axis of the tubular carrier, i.e. axis 124 is vertical when the instrument is vertical, and axis 124 is tilted at the same angle form vertical as is the instrument when the latter bears sidewardly against the bore of the tubing 110 when such tubing assumes the same tilt angle due to borehole tilt from vertical. Merely as illustrative, for the continuous rotation case, the rate of rotation of shaft 124 may be within the range 0.5 RPM to 5 RPM. The motor and housing may be considered as within the scope of means to support and rotate the gyroscope and accelerometers.

Due to rotation of the shaft 123, and lower extensions 123a, 123b and 123c thereof, the frames 125 and 225 of the gyroscopes and the frames 126 and 226 of the accelerometers are typically all rotated simultaneously about axis 124, within and relative to the sealed housing 118. The signal outputs of the gyroscopes and accelerometers are transmitted via terminals at suitable slip ring structures 125a, 225a, 126a and 226a, and via cables 127 127a, 128 and 128a, to the processing circuitry at 129 within the instrument, such circuitry for example including that described above, and multiplexing means if desired. The multiplexed or non-multiplexed output from such circuitry is transmitted via a lead in cable 113 to a surface recorder, as for example include pens 131–134 of a strip chart recorder 135, whose advancement may be synchronized with the lowering of the instrument in the well. The drivers 131a—134a for recorder pens 131–134 are calibrated to indicate borehole azimuth, degree of tilt and depth, respectively, and another strip chart indicating borehole depth along its length may be employed, if desired. The recorder can be located at the instrument for subsequent retrieval and read-out after the instrument is pulled from the hole.

The angular rate sensor 16 may take the form of gyroscope $G_1$ or $G_2$, or their combination, as described in U.S. Pat. No. 4,199,869. Accelerometers 126 and 226 correspond to 17 and 18 in FIG. 1.

In FIG. 9 the elements 13, 16, 17 and 19 are the same as in FIG. 1; however, the second accelerometer 18 of FIG. 1 is replaced by a second angular rate sensor 190 (such as gyroscope $G_2$) having one of its axes of sensitivity along the borehole axis, which serves the same function as the second accelerometer 18. Thus, the angular rate sensor 190 maintains a gimbal axis fixed (as for example horizontal or at any other desired orientation) during instrumentation travel in mode #2, and its output is connected via the servo loop 22b, 22a and amplifier 21 to the drive motor 13, so that if the hole changes direction in tilt, during such travel, accelerometer 17 will sense the amount of change, for recordation. The output of gyroscope 190 may equivalently be provided by the second axis of a two input axis first gyroscope, the other input axis of which is also provided by the first gyroscope. The second accelerometer, 18, of FIG. 1 could be added to the configuration of FIG. 9 if a second orthogonal signal normal to the borehole axis is desired, and is shown for that purpose as having output $A_2$ in FIG. 10.

Figure 11:
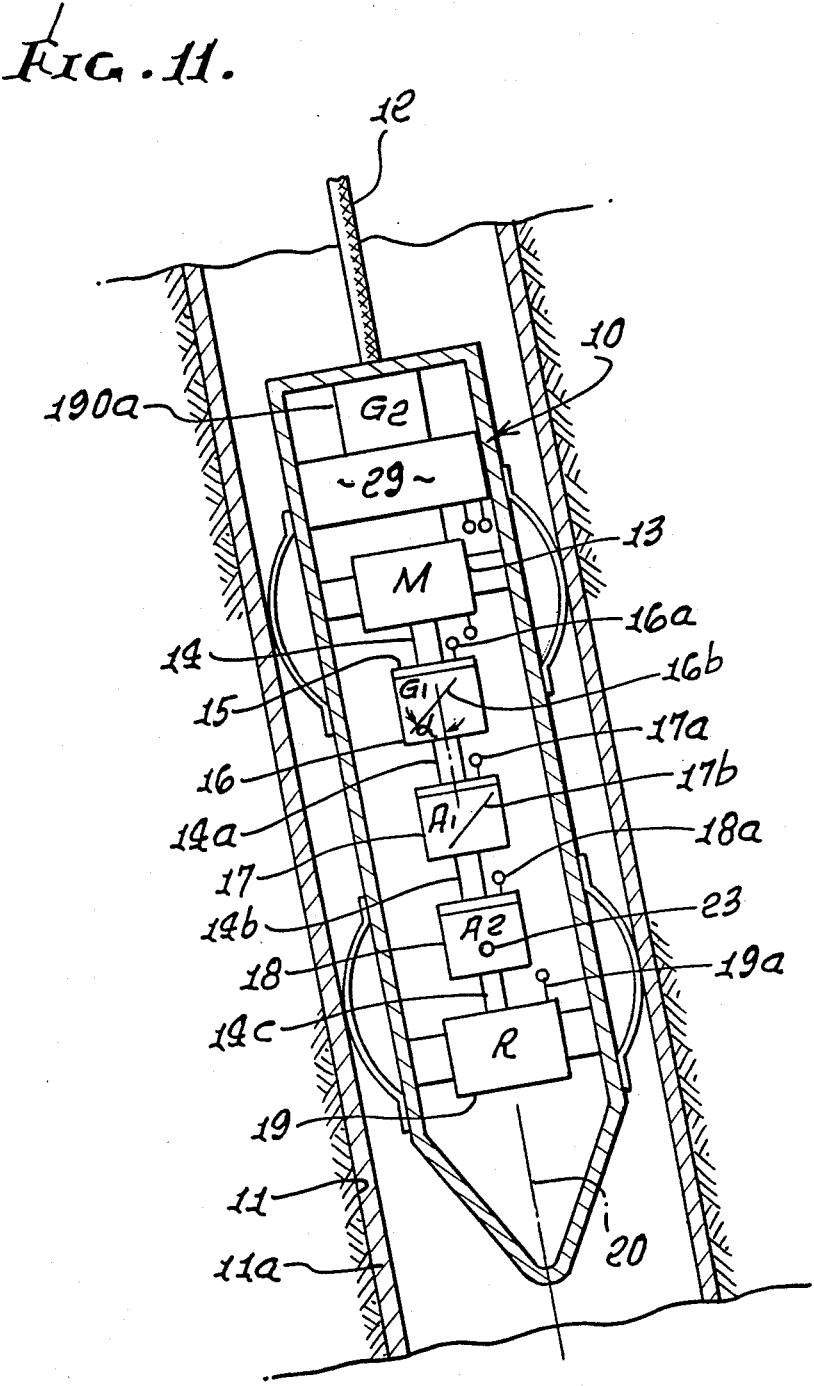

FIG. 11 shows an alternative approach to that of FIG. 9 that has unique advantages in certain applications. The second gyroscope $G_2$ may alternatively be mounted directly on the carrier (10 in FIG. 11), as indicated at 190a and may have its output (proportional to angular rate sensed about the borehole axis) integrated by integrator 31c (FIG. 1c) to provide a measurement of the rotation of the carrier, 10, about the borehole axis. This output measurement at K may then be combined, at 196 with the output signal R$_1$ from the resolver, 19, carried by line ,24, (FIG. 1c) to determine angle of shaft 14 with respect to inertial space. Thus, gyroscope G$_2$ is further characterized as having an axis of input rate sensitivity along the borehole direction and an output signal which is integrated to determine changes in the orientation of said carrier frame about an axis along the borehole direction.

Figure 1B:
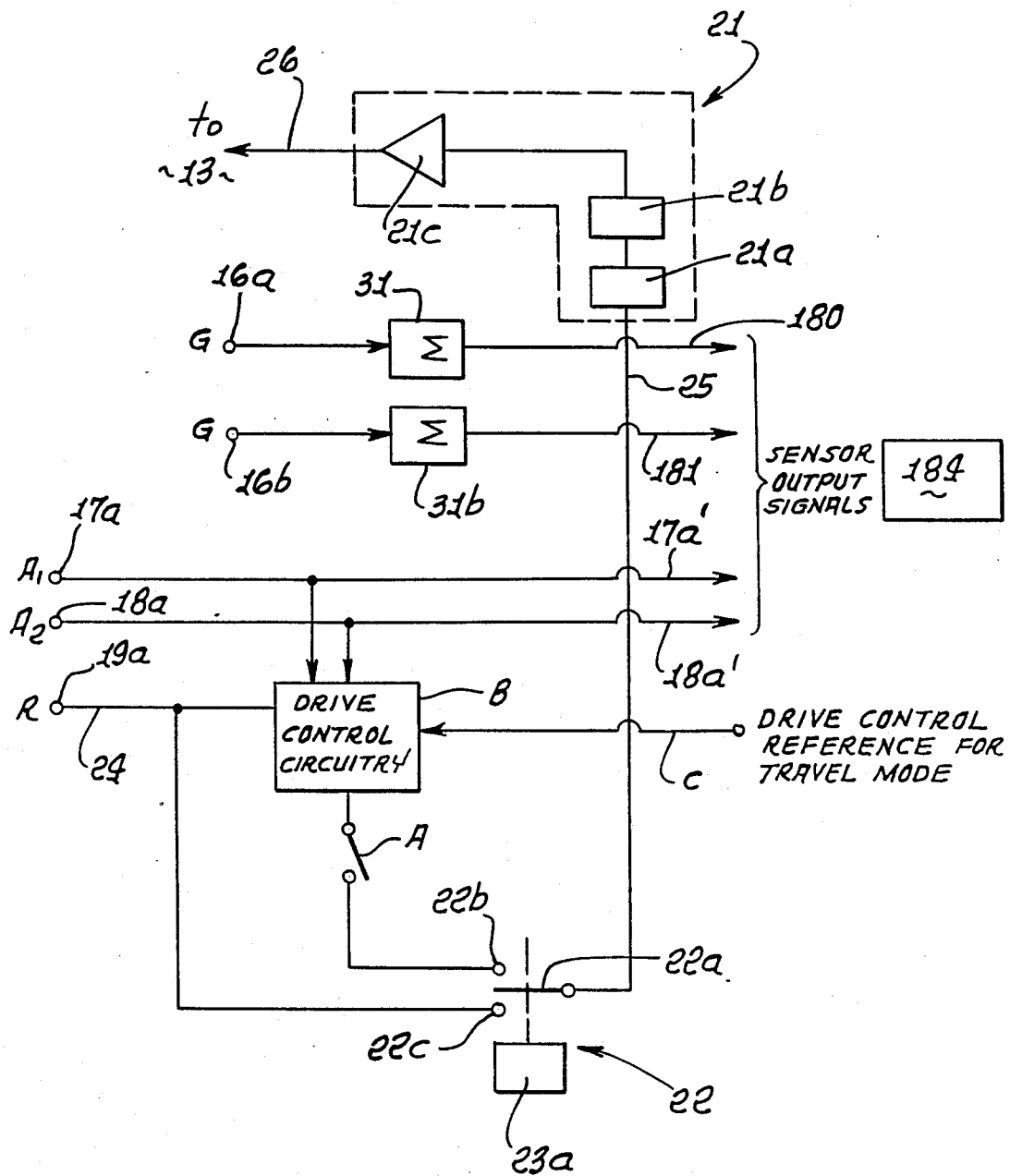
FIGS. 1b and 1c are modification associated circuit diagrams.
Figure 1C:
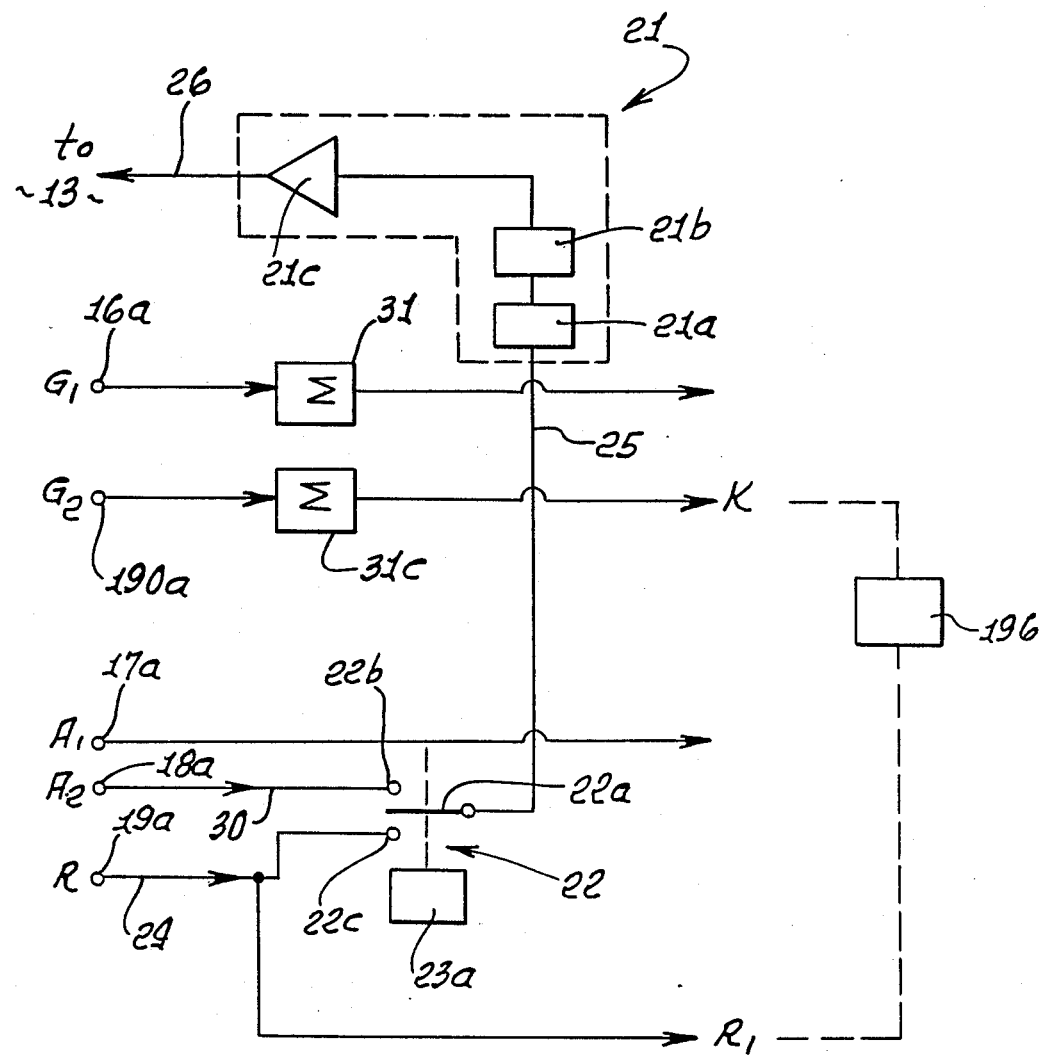

Either angular rate sensor G$_1$ or G$_2$ of FIG. 9 may have a second axis of input rate sensitivity nominally orthogonal to the borehole axis, 124, and the first input axis of angular rate sensor 16. In this case, as represented in FIG. 1b, two angular rate signal outputs as at 180 and 181 and two tilt sensitive signal outputs (as at 17a' and 18a') from those axis nominally orthogonal to the borehole axis may be combined and used together as at circuitry 184 to determine changes in the borehole inclination and azimuth while traveling, without requiring the use of the rotary drive mechanism to adjust any input axis to a horizontal or other known position. The drive mechanism may then be left disconnected as by opening switch A, while traveling, unless use of the drive is desired to lock the gimbal to the case, or to control the rotation of the gimbal during travel, so as to reduce sensor errors.

In FIG. 1b, the options for use of the drive mechanism are shown when the second angular rate sensor axis is associated with G$_1$, i.e. 16. Changes from FIG. 1a include integration circuit 31b, provision of a switch, A, to disable the drive mechanism during traveling if desired, and provision of drive control circuitry, B. The latter may employ inputs from both tilt sensor axes, 17a and 18a, the gimbal resolver, 19a, and an external drive control reference, C, to permit any desired control of the drive mechanism during travel if the drive mechanism is not disabled by switch A.

In FIG. 10, the options for use of the drive mechanism are shown when the second angular rate sensing axis is associated with G$_2$, i.e. 190. Changes from FIG. 9 include integration of the second output signal of G$_2$ in integrator 31b, addition of the second tilt sensor A$_2$, 18, from FIG. 1 to get the second orthogonal tilt output signal, 193, and control 193a therefor to enable disabling of the drive mechanism during traveling, and provision of drive control circuitry, B, which receives inputs from tilt sensors A$_1$ and A$_2$ i.e. 17 and 18, angular rate sensor G$_2$, i.e. 190, the gimbal resolver, 19, and an external drive control reference, C, to permit any desired control of the drive mechanism during traveling if the drive mechanism is not disabled by switch 193. The latter is connected between circuitry B and contact 22b.

Figure 12:
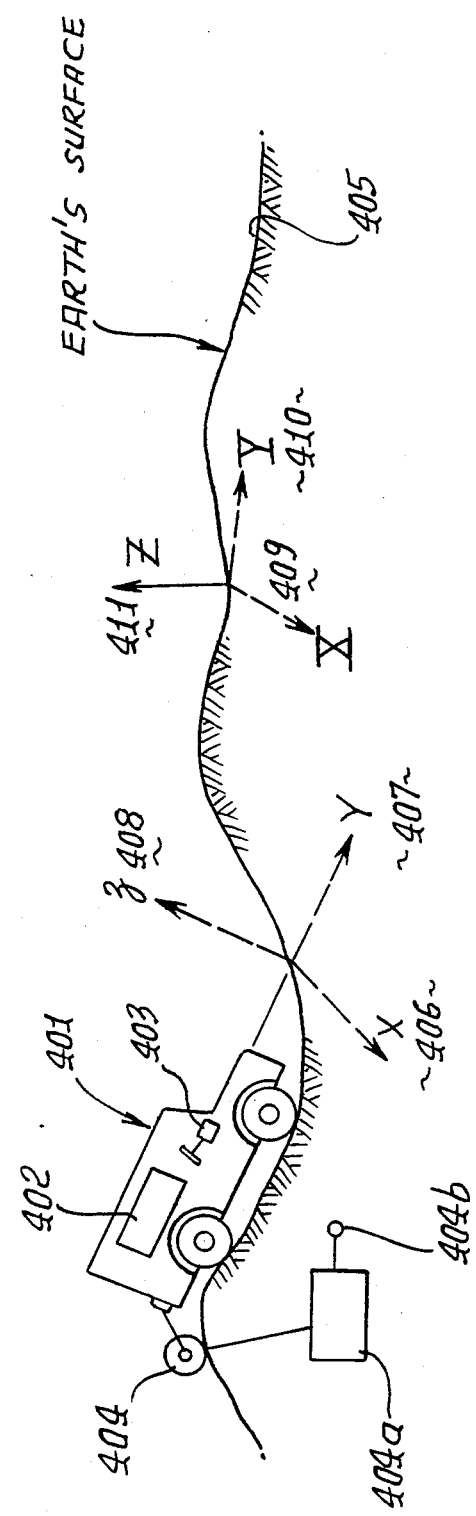
FIG. 12 is an elevation showing one configuration of a land-vehicle navigation mechanization employing the invention.

Referring now to FIG. 12, a land vehicle, 401, is shown traveling over the earth surface, 405. The vehicle orientation with respect to an orthogonal, earth-fixed coordinate set X, 409, Y, 410, and Z, 411 is defined by rotation angles about an orthogonal vehicle fixed coordinate set x, 406, y, 407, and z, 408. This latter set of vehicle fixed axes is defined such that y is forward along a vehicle axis that is horizontal and parallel to the earth surface on level ground, x is perpendicular to y and also parallel to the earth surface on level ground, and z is perpendicular to y in an upward direction. The earth-fixed coordinate set may take any of several forms commonly used. One convenient form is based on Y being a true North direction and parallel to the earth on level ground, X being a true East direction and parallel to the earth on level ground, and Z being perpendicular to X and Y in a positive upward direction. With these definitions of axes, the attitude of the vehicle may be specified given an iunitial reference orientation in which x,y and z are respectively parallel to X, Y and Z. From this reference orientation, the vehicle attitude may be specified as an azimuth rotation angle, $\psi$ about z or, Z, pitch rotation angle, $\theta$, about the resulting x axis, and a roll or cant rotation angle, $\phi$, about the resulting y axis.

In FIG. 12, a distance measurement sensor, 404, is shown as a wheel towed behind the vehicle that incorporates a transducer 404a (schematically shown) that provides an electrical output signal at 404b proportional to distance traveled by the vehicle, 401. Although shown as a wheel-type of sensor towed behind the vehicle, the distance measuring sensor may take the form of one or more of the following known devices, but is not limited to any one of them:

1. An array of one or more auxiliary wheels attached to the vehicle for distance traveled sensing,
2. Signals derived from one or more of the vehicle's drive or support wheels for wheeled vehicles,
3. Signals derived fron one or more of the vehicle's drive or support tracks for tracked vehicles such as bulldozers, military tanks or other similarly driven or supported vehicles,
4. Signals derived by integration of the output of relative velocity of the vehicle over the ground such as those that measure the Doppler frequency shift of reflected acoustic or electromagnetic energy from a surface relatively in motion in relation to the sensor.
5. Adaptive programs or directly measured signals relating topography or other known phenomenon cooperative sources with vehicle tracks.

Within the vehicle, 401, is an assembly 402, (to be described later) that measures the vehicle orientation angles ($\psi, \theta, \phi$) previously defined. The assembly also includes computational apparatus that accepts the outupt signal of the distance measuring sensor and the vehicle orientation angles to compute vehicle position in the previously defined X, Y and Z coordinate set. A control and display apparatus, 403, provides an operator interface to control the modes of operation of the assembly, 402, and display orientation and position data to the vehicle operator or other personnel in the vehicle. Thus apparatus 403 may be operatively connected to sensor 404 via 404a and 404b to display position data.

The assembly, 402, generally comprises inertial angular rate sensing means, inertial acceleration or gravity sensing means, computation means, electric circuit means to provide input/output interfaces to the distance measurement sensor, 404, and the control and display apparatus, 403, and power supply means to provide needed operating voltages from the vehicle prime electrical power source.

Figure 13:
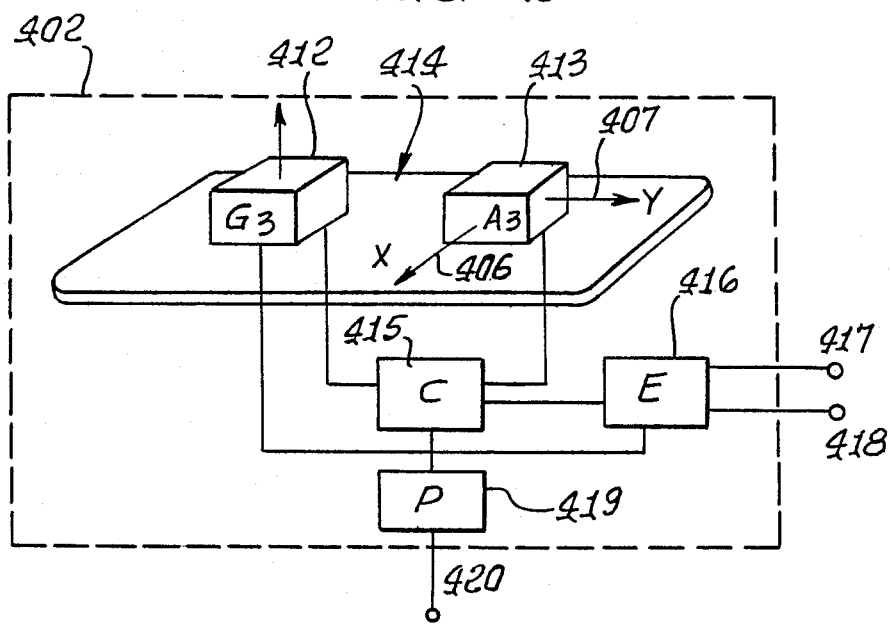
FIG. 13 is a diagram showing the simplest possible configuration of a land-vehicle navigation mechanization based on the invention.

FIG. 13 shows the simplest embodiment of the assembly, 402, that measures the vehicle orientation angles ($\psi$, $\theta$ and $\phi$). An inertial angular rate sensing means G$_3$, 412, and an inertial acceleration or gravity sensing means A$_3$, 413, are mounted to a carrier plate, 414, that is rigidly connected to the body of the vehicle, 401, of FIG. 12. The inertial angular rate sensor, G$_3$, 412 may take any of the forms for such sensors described above. G$_3$ is further characterized by having at least one axis of input angular rate sensitivity which is parallel to the vehicle z axis, 408. The inertial acceleration sensor means A3, 413, may also take any of the forms for such sensor described above. A3 is further characterized by having at least two axes of input inertial acceleration or tilt sensitivity which are parallel to the vehicle x axis, 406, and to the vehicle y axis, 407, respectively.

The outputs of sensing means G3 and A3 are connected to computing means C, 415, for the computation of the vehicle orientation angles. Electronic circuitry, E, 416, provides for interface of control and display information between the computer means, C, and the external control and display apparatus, 403 of FIG. 12. Such control and display data is communicated by cable or wire 417. Power supply means, P, 419, provides required operating voltages to G3, A3, C and E means from the external vehicle prime power source connected at 420.

The embodiment shown in FIG. 13 has no means for self-initialization of the vehicle azimuth angle, $\psi$, and therefore requires some external initial value provided to the computer means, C. The outputs of sensor means A3 can be used to compute the two level tilt orientation angles $\theta$, $\phi$, as previously defined. Given an initial value for the azimuth angle, $\psi$, from external sources, the continuous value of azimuth as the vehicle moves over the earth may be computed by proper integration of the output of sensor means G3. This integration must correct for the tilt orientation angles $\theta$, and $\phi$ by dividing the output of sensing means G3 by the product Cos $\phi$ Cos $\phi$ to obtain the actual change in azimuth angle $\psi$ from the inertial angular rate sensed about the vehicle z axis due to vehicle heading angle change. Also, either before or after the integration of the output of G3 sensing means corrections must be computed based on the three orientation angles, $\psi$, $\theta$, $\phi$, to subtract the effect of the component of the earth's angular rotation rate along the G3 sensitive axis from the azimuth angle output.

As described above, the assembly, 402 provides the three vehicle orientation angles. Since no input has yet been discussed from the distance measurement sensor, 404, in FIG. 12, no position navigation outputs are available and in cases of significant horizontal (x, y axes) vehicle accelerations, all orientation angle outputs will degrade in accuracy. Much improved orientation accuracy as well as navigation position outputs occurs by connecting the line shown at 418 in FIG. 13 to the distance measurement sensor, 404, in FIG. 12. With this connection, a measure of distance traveled along the vehicle y axis, 407, is available to the computing means, C, 415. Firstly, this distance measurement can be used with the three vehicle orientation angles to compute vehicle position relative to the starting point in the previously defined earth-fixed coordinate set, and such position data can then be sent to the control and display apparatus of FIG. 12 for use in the vehicle. Secondly, this distance measure can be used to improve the accuracy of the vehicle orientation angle measurement by correcting for vehicle horizontal accelerations.

Assuming that the vehicle travels over the earth without any side-slip, i.e., no velocity component in the x axis, 406, direction, then the output of the A3 inertial acceleration sensing means from its axis of sensitivity parallel to the vehicle y axis will be proportional to:

$$g \sin \theta + d^2y/dt^2 \qquad (1)$$

where:
g is the magnitude of the earth's gravity field
$\theta$ is the vehicle pitch angle, and
$d^2y/dt^2$ is the second derivative of the distance traveled in the y-axis direction with respect to time.

The output of A3 from its axis of sensitivity parallel to the vehicle x axis will be proportional to:

$$g \sin \phi \cos \theta + \omega dy/dt \qquad (2)$$

Where, in addition to g and $\theta$ defined above:
$\phi$ is the vehicle roll angle.
dy/dt is the first derivative of the distance traveled in the y-axis direction, and
$\omega$ is the angular velocity of the vehicle with respect to inertial space about the vehicle z-axis direction.

It is the terms involving the first derivative (normally called centripetal acceleration) and second derivative (normally called linear acceleration) of the distance traveled along the vehicle y axis that cause errors in measuring the vehicle pitch and roll orientation angles that subsequently cause error in measurement of the vehicle azimuth angle. Since a measure of the vehicle angular velocity about the z axis is directly available from the G3 sensing means, 412, and a measure of the distance traveled is the y-axis direction is available from the distance measurement sensor, 404, corrections equivalent to $d^2y/dt^2$ and $\omega$ dy/dt can be computed. Since many types of vehicle distance measuring sensors may produce noisy output data (containing error components of high frequency content) the computation of equivalent first and second derivatives may lead to significant errors.

Figure 14:
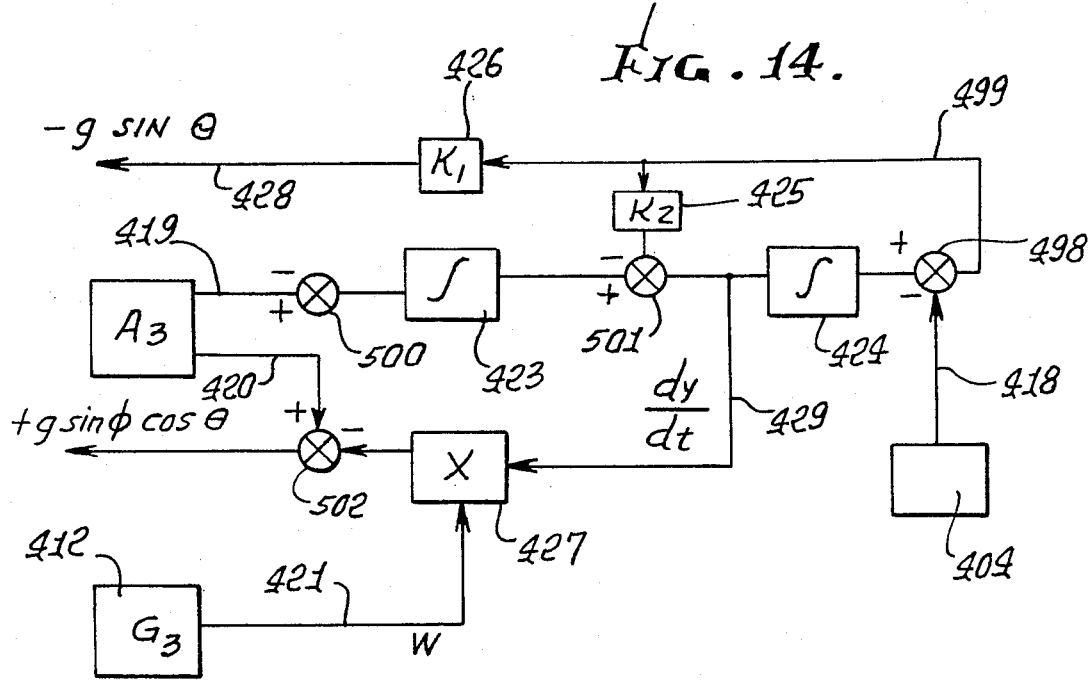
FIG. 14 is a diagram of modifications to improve accuracy in a dynamic environment.

One advantageous method of correcting for the influence of vehicle acceleration that avoids the noise magnification from noisy distance data is shown in FIG. 14. In FIG. 14, the output of the inertial acceleration or tilt sensor A3, 413, that is from its input axis parallel to the vehicle y axis, is shown at 419. This output is integrated twice in successive integrator means 423 and 424. From this doubly integrated output, the output signal from the distance measuring sensor 404, on lead 418 is substracted at 498 to obtain an output at 499 that is fed back in a negative feedback sense to the input of integrator 424 through a gain factor, K2, 425, and to the input of integration 423 through a gain factor, K1, 426. This signal fed back through gain K1 and appearing as an output at 428 can be shown to be proportional to $-g \sin \theta$ independent of vehicle accelerations in the y-axis direction. The gain constants K1 and K2 determine the speed of response and the damping factor for the equivalent filtering process. From the output 428 the vehicle pitch angle can be directly computed without acceleration-induced error. See also subtractors 500 and 501.

It may also be shown that the output at lead 429 is proportional to the vehicle velocity along its y axis, dy/dt. This signal at 429 is presented as one input to a four quadrant multiplier function, 427. The output of the angular rate sensor, G3, 412, is at 421 and is a measure of W, the vehicle angular velocity about its z axis. This output at 421 is presented to the second input to multiplier 427.

The output of multiplier 427 is subtracted at 502 from the output of the inertial angular rate or tilt sensor, A3, 413, that is from its input axis parallel to the vehicle X axis, at 420, to provide a measure at 430 that is proportional to g sin $\phi$ cos $\theta$ independent of the centripetal acceleration resulting from forward velocity, dy/dt, and angular rate, $\omega$. Other equivalent mechanizations can be developed to correct the output of sensor means A3 for linear and centripetal accelerations. The computational functions, or their equivalents, of FIG. 14 may be accomplished by analog computing means, digital computing means, or any desired combination of such means for separate portions.

The apparatus, 402, discussed to this point provides continuous outputs of the three vehicle orientation angles as the vehicle proceeds over the earth surface using, as previously stated, an external source of data for initializing the azimuth angle of the vehicle at the starting point.

Figure 15:
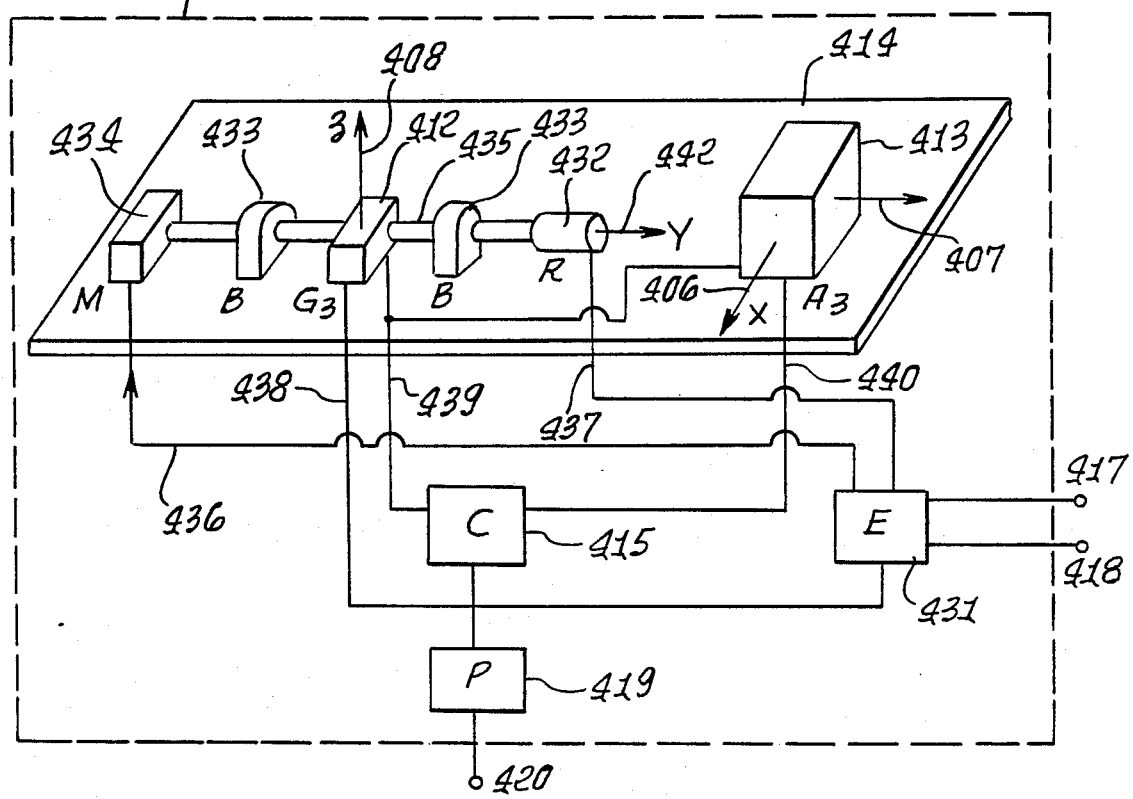
FIG. 15 is a diagram of additional modifications to provide self-initialization of the azimuth direction of the vehicle.

Self initialization of vehicle azimuth by gyro-compassing action is a process similar to that used for the borehole survey tool in FIGS. 1 through 11 and may be provided most simply by providing means to rotate the inertial angular rate sensing means, G3 in FIG. 13, about an axis fixed to the vehicle so that its input axis of sensitivity can be placed in different orientations. FIG. 15 shows one configuration to achieve this. The most significant difference between this configuration and that of FIG. 13 is that the inertial angular rate sensor means, G3, 412, is mounted on a shaft assembly, 435, such that its input axis of sensitivity, shown at 408 (in the z-axis direction) may be positioned anywhere in the plane perpendicular to the shaft axis of rotation. The shaft assembly 435, is supported to the carrier plate, 414, by two bearing assemblies, B, 433. A motor M, 434, provides torque to the shaft assembly in response to electrical commands on lead 436. A resolver, R, 432, provides an indication of the angular position of the shaft assembly with respect to the carrier plate by signals at lead 437. The electronic circuitry, E, at 431 is different from the similar function in FIG. 13 only in its interface to and control of the shaft assembly position by means of motor, M, and resolver, R. The initial measurement of the vehicle azimuth direction is made by operating the shaft assembly, 435, such that the input axis of sensitivity of G3, 412, is rotated about the y-axis direction, either continuously or incrementally to two or more discrete positions and processing the G3 output data to determine initial vehicle azimuth. Following this initialization, the shaft assembly is used to position the input axis of G3 to be parallel to the vehicle z axis. In this position the mode of operation is changed to measure azimuth changes by integration of the output of sensor G3 just as described for FIG. 13 and as discussed for the borehole survey tool in its travel mode.

Figure 15A:
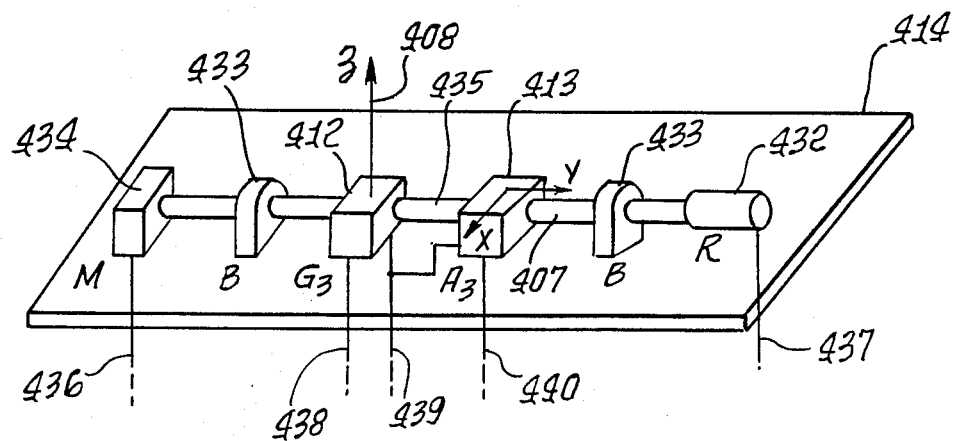
FIG. 15a shows an alternative form, for such self-initialization.
Figure 15B:
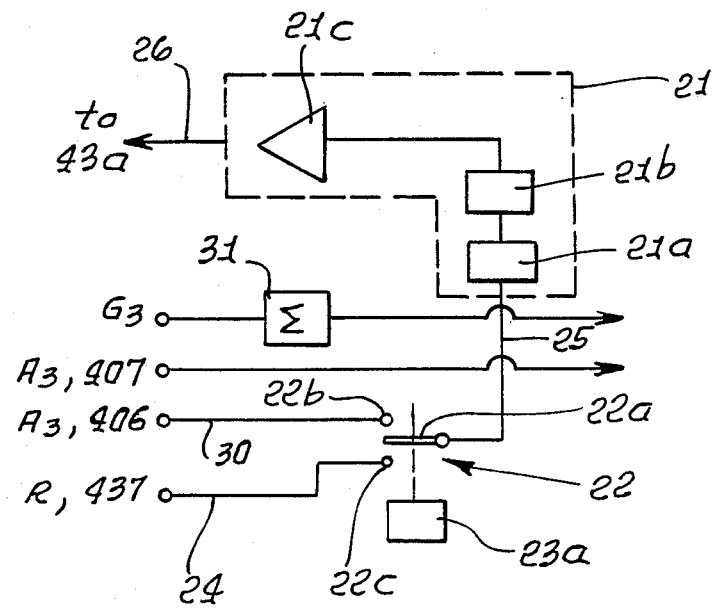

FIG. 15a shows a variation in the configuration for self-initialization of the vehicle azimuth angle. In this variation, the inertial acceleration or tilt sensor means, A3, 413, is moved from direct attachment to the carrier plate, 414, to the shaft assembly, 435, as shown. This configuration is substantially the same functionally as that shown in the borehole survey tool of FIG. 1. The sensors G3 and A3 of FIG. 15a provide the same functions as the Sensors G, 15, and A1, A2, (17, 18) of FIG. 1. This configuration may be used to provide self-initialization by multiple-position measurements of G3 and A3 as discussed for the FIG. 1 borehole survey tool. Further, following self-initialization, the output of the A3 sensor from its x-axis, 406, may be used in the vehicle travel mode to maintain the shaft assembly, 435, and thus the x-axis, 406 at a pre-determined orientation with respect to horizontal during said vehicle travel. FIG. 15b shows servo means for operating in both the initialization and travel modes. This configuration is a modification of FIG. 1a for the borehole survey tool usage. Items 21 through 31 are the same as previously described. The items G, A1, A2, R and the lead designated "to 13" are replaced by G3, A3, R and "to 434" to show the usage in the land navigator.

Figure 16:
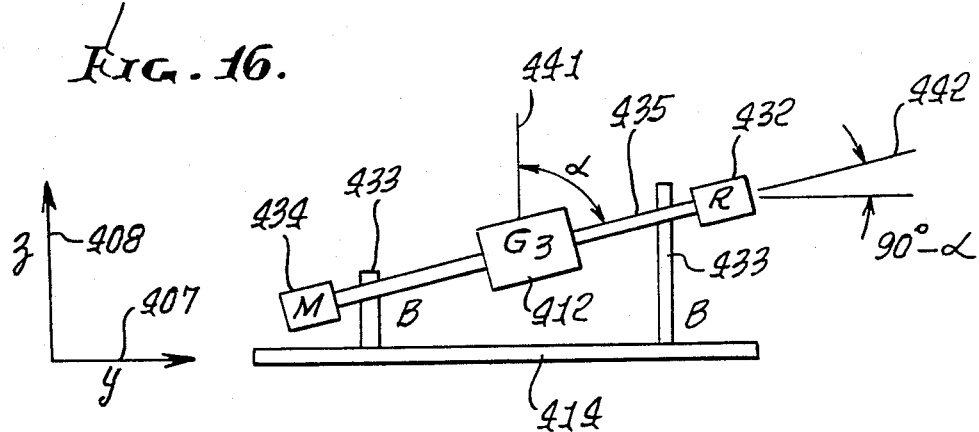
FIG. 16 is an improvement over FIG. 15 for certain initial vehicle orientations during such self-initialization.

U.S. Pat. Nos. 4,197,654 and 4,559,713 show that the determination of azimuth directions by structures similar to FIG. 1 and FIG. 15a will result in degraded accuracy when the axis of sensor rotation, 20 in FIG. 1, and 407 in FIG. 15a, approaches a horizontal east-west direction. These patents show that this degradation may be reduced by canting the inertial angular rate sensor means so that its input axis of sensitivity has a component along the sensor rotation axis. This is shown, for example, in FIG. 1 where the sensor G, 16, may have its sensing axis, 16b, canted at an angle $\alpha$ with respect to the rotation axis, 20. The sensor G3, 412 in FIGS. 15 and 15a could be similarly canted at some angle $\alpha$ with respect to the axis of rotation of the shaft assembly, 435, to obtain the same benefits that are provided in the borehole survey case. In the land-vehicle navigation problem, the average attitude of the vehicle is expected to be such that the vehicle vertical axis averages to the Earth-fixed vertical axis. For best accuracy, therefore, the inertial angular rate sensor input axis of sensitivity should be parallel to the vehicle vertical axis. FIG. 16 shows a means to achieve this latter objective if the G3 sensor means input axis, 441, is canted at an angle, $\alpha$ to the rotation axis, 442. If the rotation axis 442, is canted at an angle 90-$\alpha$ with respect to the carrier plate 414 (which is parallel to the vehicle y axis, 407) then the G3 input axis, 441 will be parallel to the vehicle z axis, 408, during the travel mode, following self-initialization.

The configurations of the invention for land navigation as disclosed in FIGS. 12 through 16 may be further augmented and improved by providing additional axes of inertial angular rate sensing such as shown and discussed for FIG. 6, FIG. 11, FIG. 1b, FIG. 1c, FIG. 9, and FIG. 10 in relation to the borehole surveying tool. Any or all of these augmentations may be used to obtain similar benefits in the land-vehicle navigation apparatus described above.

The method of use for the land-vehicle apparatus for which the azimuth and tilt measuring mechanism is shown in FIG. 13 includes the steps of:

(a) operating the inertial angular rate sensing and the inertial acceleration sensing means and their associated computational, electronic circuitry, and power supply means at a first location in a land vehicle, (b) determining from the inertial acceleration means output signals the two vehicle orientation angles about Earth-fixed level axis that are the vehicle pitch and roll angles at the first location, (c) generating and accepting an external input to define the initial vehicle orientation angle about an Earth-fixed vertical axis to establish the vehicle azimuth at the first location, and (d) then continuously determining the three vehicle orientation angles roll, pitch and azimuth as the vehicle moves over the surface of the earth by processing the outputs of the inertial acceleration sensing means to measure the vehicle roll and pitch angles and by integrating the output of the inertial angular rate sensor to measure changes in vehicle azimuth since the initial value, and (e) combining the output of an external distance measurement sensor with the vehicle orientation angle data obtained in (d) to compute land-vehicle position.

For the configuration shown in FIG. 15, FIG. 15a and FIG. 16, the method is the same as that above for FIG. 13 except that steps (b) and (c) are replaced by:

(b) operating the inertial angular rate and inertial acceleration sensor means together so that all three of the vehicle orientation angles, roll, pitch and heading, with respect to an Earth-fixed coordinate set, are self-determined to initialize the land navigation process.

In either of the above methods, following initialization or during the traveling mode of (d) and (e) the vehicle may be stopped, and corrections made to the system azimuth drift rate, or rate of azimuth error buildup, by observing any change in the azimuth angle while the vehicle is stopped. Corrections to the inertial angular rate sensor output may be applied until the indicated rate of azimuth change is at an acceptably low level.

In this manner the accuracy of the azimuth output may be greatly improved. Many error sources in the inertial angular rate sensor output signal and in the self-initialization process are eliminated by this drift-tuning of residual azimuth error rate. The correction of azimuth error rates may be accomplished either automatically, by the computing means, C, 415, of FIGS. 13 or 15, or manually, by the operator observing the rate of change of azimuth shown by the display, 403, of FIG. 12 and entering rate corrections to the computing means, C. If automatic correction is to be used, the computing means, C, must determine that the vehicles is stopped either from the lack of position change inputs from the distance traveled sensor, 404, of FIG. 12, or by an operator input indicating that the vehicle is stopped and that drift-tuning should proceed.

Further for the latter configurations that provide a capability for self-initialization of azimuth, the apparatus may be returned to the self-initialization mode to re-establish a value for vehicle azimuth that will eliminate any growth in error since the first self-determination of azimuth.

The discussion of FIG. 15 and FIG. 15a indicated that the axis of rotation of the shaft assembly, 435 was parallel to the vehicle y axis, 407. In general, the axis of rotation can be in any nominally horizontal direction without altering the teachings of the invention.

I claim:

1. In a land vehicle navigation apparatus, the combination comprising
    (a) intertial angular rate sensor means having a sensitive axis,
    (b) inertial acceleration or tilt sensor means having at least two sensitive axes, said sensitive axes being nominally orthogonal to said inertial angular rate sensor's sensitive axis,
    (c) means to accept from an external source an initial value of the vehicle's azimuthal orientation angle with respect to an Earth-fixed coordinate set, and
    (d) circuitry operatively connected with said (a) and (b) sensor means and said (c) input acceptance means to determine three vehicle orientation angle, roll, pitch, and azimuth, with respect to an Earth-fixed coordinate set as the land vehicle travels over the Earth surface, and wherein changes to said azimuth angle during travel are determined by integration of the output of said (a) sensor means,
    (e) and a land vehicle supporting said (a) and (b) means, and having support means on which the vehicle travels over the Earth's surface.

2. The apparatus of claim 1 including a means to accept an external input that is a measure of the distance-of-travel of the vehicle over the Earth surface, whereby said vehicle orientation angles may be used with said distance-of-travel to comput vehicle position changes during vehicle travel.

3. The apparatus of claim 2 including means enabling use of said external input measure of vehicle distance-of-travel to compute vehicle linear and centripetal accelerations to correct the roll and pitch vehicle orientation angles computed from said (b) sensor means.

4. In a land vehicle navigation apparatus, the combination with the vehicle comprising
    (a) inertial angular rate sensor means having a sensitive axis,
    (b) inertial acceleration or tilt sensor means having at least two sensitive axes, said sensitive axes being arranged to be nominally located at the vehicle in a plane parallel to the Earth's surface,
    (c) a rotary drive operatively connected to said (a) means to rotate said (a) means about an axis extending generally at the vehicle in a plane parallel to the Earth's surface,
    (d) circuitry operatively connected with said (a) and (b) sensor means to determine three vehicle orientation angles, roll, pitch, and azimuth, with respect to an Earth-fixed coordinate set at a first location, and to also determine said three vehicle orientation angles as the land vehicle travels over the Earth surface wherein changes to said azimuth angle during travel are determined by integration of the output of said (a) sensor means,
    (e) said (a) and (b) means and said (c) drive being carried by the vehicle, having support means on which the vehicle travels over the earth's surface.

5. The apparatus of claim 4 including a means to accept an external input that is a measure of the distance-of-travel of the vehicle over the Earth surface for enabling use of said vehicle orientation angles with said distance-of-travel to compute vehicle position changes during travel.

6. The apparatus of claim 5 including means for enabling use of said external input measure of vehicle distance-of-travel to compute vehicle linear and centripetal accelerations to correct the roll and pitch vehicle orientation angles computed from said (b) sensor means.

7. In a land vehicle navigation apparatus, the combination for use with the vehicle comprising:
    (a) inertial angular rate sensor means having a sensitive axis,
    (b) inertial acceleration or tilt sensor means having at least two sensitive axes, said sensitive axes being arranged to be nominally located at the vehicle in a plane parallel to the Earth's surface,
    (c) a rotary drive operatively connected to said (a) and (b) means to rotate said (a) and (b) means about an axis extending generally at the vehicle in a plane parallel to the Earth's surface,
    (d) circuitry operatively connected with said (a) and (b) sensor means to determine three vehicle orientation angles, roll, pitch, and azimuth, with respect to an Earth-fixed coordinate set at a first location, and to also determine said three vehicle orientation angles as the land vehicle travels over the Earth surface wherein changes to said azimuth angle during travel are determined by integration of the output of said (a) sensor means,
    (e) said (a) and (b) means, and said (c) drive and (d) circuitry being carried by the vehicle, which has support means on which the vehicle travels over the earth's surface.

8. The apparatus of claim 7 including means to accept an external input that is a measure of the distance-of-travel of the vehicle over the Earth surface for enabling use of said vehicle orientation angles with said distance-of-travel to compute vehicle position changes during travel.

9. The apparatus of claim 8 including error correcting means for enabling use of said external input measure of vehicle distance-of-travel to compute vehicle linear and centripetal accelerations to correct the roll and pitch vehicle orientation angles computed from said (b) sensor means.

10. In a land vehicle navigation apparatus, the combination comprising
   (a) inertial angular rate sensor means having a sensitive axis,
   (b) inertial acceleration or tilt sensor means having at least two sensitive axes, said sensitive axes being nominally orthogonal to said inertial angular rate sensor's sensitive axis,
   (c) means to accept from an external source an initial value of the vehicle's azimuthal orientation angle with respect to an Earth-fixed coordinate set, and
   (d) circuitry operatively connected with said (a) and (b) sensor means and said (c) input acceptance means to determine three vehicle orientation angles, roll, pitch, and azimuth, with respect to an Earth-fixed coordinate set as the land vehicle travels over the Earth surface, and wherein changes to said azimuth angle during travel are determined by integration of the output of said (a) sensor means,
   (e) and a land vehicle supporting said (a) and (b) means, and having support means on which the vehicle travels over the Earth's surface,
   (f) means to accept an external input that is a measure of the distance-of-travel of the vehicle over the Earth surface for enabling use of said vehicle orientation angles with said distance-of-travel to compute vehicle position changes during travel,
   (g) error correcting means for enabling use of said external input measure of vehicle distance-of-travel to compute vehicle linear and centripetal accelerations to correct the roll and pitch vehicle orientation angles computed from said b) sensor means.
   (h) said error correcting means including a first integrator to integrate output provided by said angular rate sensor means along the vehicle direction of travel, and a second integrator to integrate output of the first integrator, and subtractor means to subtract the output of the second integrator from said external input to provide an output fed back to the second integrator with selected gains, whereby linear acceleration is corrected.

11. The apparatus of claim 10 wherein said error correcting means includes a multiplier, having one input connected to receive output from the first integrator, and another input connected to receive output from said inertial acceleration or tilt sensor means, and a subtractor connected to the output of the multiplier and to the output of the inertial angular rate sensor means, as directionally related to the vehicle direction of movement, to provide an output correction for centripetal acceleration.

12. In method of operating apparatus as defined in claim 7, the steps that include:
   (i) operating said device to rotate the input axis of sensitivity of the rate sensor means about an axis extending in the direction of vehicle travel to two or more discrete positions,
   (ii) and processing the output of said rate sensor means to derive initial vehicle azimuth.

13. The method of claim 12 including:
   (iii) positioning said input axis of sensitivity of the rate sensor means to be parallel to the vehicle Z axis that is characterized as perpendicular to the vehicle direction of travel and upright relative to the vehicle.

14. In a land navigation apparatus, the combination for use with the vehicle comprising
   (a) inertial angular rate sensor means having a sensitive axis,
   (b) inertial acceleration or tilt sensor mean shaving at least two sensitive axes, said sensitive axes being arranged to be nominally located at the vehicle in a plane parallel to the Earth's surface,
   (c) a rotary drive operatively connected to said (a) and (b) means to rotate said (a) and (b) means about an axis extending generally at the vehicle in a plane parallel to the Earth's surface,
   (d) circuitry operatively connected with said (a) and (b) sensor means to determine three vehicle orientation angles, roll, pitch, and azimuth, with respect to an Earth-fixed coordinate set at a first location, and to also determine said three vehicle orientation angles as the land vehicle travels over the Earth surface wherein changes to said azimuth angle during travel are determined by integration of the output of said (a) sensor means,
   (e) said (a) and (b) means, and said (c) drive and (d) circuitry being carried by the vehicle which has support means on which the vehicle travels over the earth's surface,
   (f) and wherein an erroneous indicated rate-of-change of the vehicle azimuth angle is at times produced by said integration, and including apparatus to detect that the vehicle is stopped, to measure said erroneous indicated rate-of-change of the vehicle azimuth angle, and to compute corrections to be applied in subsequent operations to reduce said erroneous rate-of-change of azimuth angle.

15. In the method of operating land navigation apparatus incorporating the apparatus of claim 14, the step that includes:
   (i) stopping the vehicle periodically for a fixed known time to permit the apparatus to determine any erroneous rate-of-change of vehicle azimuth and to develop corrections to such erroneous rate, for subsequent use.

* * * * *